US009250938B2

(12) United States Patent
Herring et al.

(10) Patent No.: US 9,250,938 B2
(45) Date of Patent: Feb. 2, 2016

(54) CACHING RUNTIME GENERATED CODE

(75) Inventors: Nathan Herring, Seattle, WA (US); David C. Wrighton, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1225 days.

(21) Appl. No.: 12/251,497

(22) Filed: Oct. 15, 2008

(65) Prior Publication Data

US 2010/0095284 A1    Apr. 15, 2010

(51) Int. Cl.
G06F 9/44    (2006.01)
G06F 9/455   (2006.01)

(52) U.S. Cl.
CPC .................................. *G06F 9/4552* (2013.01)

(58) Field of Classification Search
CPC . G06F 9/44516; G06F 9/45504; G06F 9/443; G06F 8/41; G06F 8/447
See application file for complete search history.

(56) References Cited

U.S. PATENT DOCUMENTS

| 6,427,234 | B1* | 7/2002 | Chambers et al. ............ 717/140 |
| 6,947,955 | B2 | 9/2005 | Cox et al. |
| 7,219,329 | B2 | 5/2007 | Meijer et al. |
| 7,506,119 | B2 | 3/2009 | Gao et al. |
| 7,624,388 | B2 | 11/2009 | Hsieh et al. |
| 2002/0062354 | A1* | 5/2002 | Suraski et al. ................ 709/212 |
| 2003/0101208 | A1* | 5/2003 | Chauvel et al. .................... 709/1 |
| 2004/0123278 | A1 | 6/2004 | Nanja et al. |
| 2004/0186862 | A1 | 9/2004 | Garthwaite |
| 2004/0210865 | A1 | 10/2004 | Shimura |
| 2005/0246697 | A1 | 11/2005 | Hsieh et al. |
| 2006/0101431 | A1* | 5/2006 | Pepin et al. .................... 717/138 |
| 2006/0288353 | A1 | 12/2006 | King et al. |
| 2007/0006185 | A1 | 1/2007 | Choi et al. |
| 2007/0061787 | A1 | 3/2007 | Trowbridge |
| 2009/0307430 | A1* | 12/2009 | Bruening et al. ............. 711/119 |

FOREIGN PATENT DOCUMENTS

JP    2005-250958 A     9/2005
RU       2287181 C2    11/2006

OTHER PUBLICATIONS

Markus Ulrich Mock, "Automating Selective Dynamic Compilation", 2002.*
Notification of Transmittal of the International Search Report and the Written Opinion of the International Searching Authority mailed Apr. 28, 2010.
Written Opinion of the International Searching Authority mailed Apr. 28, 2010.

(Continued)

*Primary Examiner* — Li B Zhen
*Assistant Examiner* — Lenin Paulino
(74) *Attorney, Agent, or Firm* — Kevin Sullivan; Micky Minhas

(57) ABSTRACT

A program entity that generates code but that does not perturb global state is identified. Code produced by the identified program entity can be assigned an identifier and cached the first time it is executed. Subsequent executions of the program entity can eliminate generation of the code and/or translation of the generated code into native binary code. The runtime generated code and native binary code can be cached in a machine-wide cache, or can be added to the metadata of the assembly generated from the source code of the program entity.

20 Claims, 6 Drawing Sheets

(56) References Cited

OTHER PUBLICATIONS

Freeman, Miller. "Generating Code at Run Time with Reflections. Emit", Windows Developer's Journal, Lawrence, KS, US, vol. 13, No. 8, Aug. 1, 2002, pp. 26-34.

Extended European Search Report and European Search Opinion for PCT/US2009059125, mailed on Feb. 5, 2013. 7 Pages.

Sells, et al., "Generating Code at Run Time with Reflection.Emit", retrieved at <<http://www.ddj.com/windows/184416570>>, Aug. 1, 2002, pp. 6.

Snell, et al., "Reflection Part 2: Emit", retrieved at <<http://www.code-magazine.com/articleprint.aspx?quickid=0301051&printmode=true>>, Aug. 18, 2008, pp. 10.

Guest, Simon ,"Using Reflection Emit to Cache .NET Assemblies", retrieved at <<http://msdn.microsoft.com/en-us/library/ms973916.aspx>>, Feb. 2002, pp. 20.

"Table of Contents", retrieved at <<http://www.devhood.com/training_modules/dist-c/AdvancedCLR/advancedclr.htm#_Toc527857364>>, Aug. 18, 2008, pp. 13.

Blackstock, Michael A., "Aspect Weaving with C# and .NET", retrieved at <<http://www.cs.ubc.ca/~michael/publications/AOPNET5.pdf>>, Month 1-2, 2004, ACM, pp. 9.

Second Office Action Received for China Patent Application No. 200980141635.0, Mailed Date: Nov. 6, 2013, Filed Date: Sep. 30, 2009, 6 Pages.

Office Action Received in Japan Patent Application No. 2011-532141, Mailed Date: Nov. 19, 2013, Filed Date: Sep. 30, 2009, 4 Pages.

Notice of Allowance Received in Japan Patent Application No. 2011-532141, Mailed Date: Mar. 3, 2014, Filed Date: Sep. 30, 2009, 4 Pages.

Notice of Allowance Received in Russian Patent Application No. 2011114807, Mailed Date: Jan. 27, 2014, Filed Date: Sep. 30, 2009, 15 Pages.

* cited by examiner

CACHING RUNTIME GENERATED CODE

BACKGROUND

Traditionally, software compilers produce native code, that is, binary code that is specific to the machine on which the code will run. The native (unmanaged) code produced by traditional compilers typically includes everything an operating system needs to run the code, but little else. In contrast, in virtual machine environments, source code is compiled to an intermediate byte code representation that is not specific to any particular machine. In addition, the output of a managed code compiler typically includes considerably more information than just binary code. The additional information describes characteristics of the binary code and is sometimes called metadata: a generic term for data that describes other data, where in this case, the described data is the binary code. The container that contains the intermediate byte code and metadata is sometimes called a managed assembly. These containers can also be referred to as class files, Java archives or Java modules. The term "assembly" or "managed assembly" as used herein refers to any such container of byte code and metadata.

In an unmanaged environment, at runtime, pre-existing native instructions are loaded into memory and are executed. In a managed environment, at runtime, the managed assembly can be compiled or translated into native binary instructions right before execution. That is, the managed assembly can be loaded into memory and compiled by a just-in-time (JIT) or on-the-fly compiler into machine-specific and runtime-specific instructions, which are then executed. While the compilation/translation phase of the managed environment involves additional processing that may affect performance, on the other hand, the JIT/on-the-fly compiler may be able to make environment-specific optimizations that an unmanaged environment is unable to take advantage of. For example, if a JIT/on-the-fly compiler knows that the code that is executing is running with full trust, it can skip certain expensive security checks that could not be skipped in an unmanaged environment.

In a managed environment, instead of compiling a managed assembly right before it is executed, the source code or intermediate byte code can be compiled to native binaries by an optimizing compiler and stored (cached) before being run on a host system. For example, a native image generator such as NGEN may produce a native binary image for the environment by converting the intermediate byte code into native machine instructions in binary before a request is received to execute the assembly. In this way, at runtime, pre-existing executable code can be loaded and run without the second compilation/translation phase, in a fashion similar to that of a traditional native code environment. Although caching is intended to make the assembly execute faster by removing the JIT/on-the-fly compilation/translation process at runtime, performance may not be improved because environment-specific optimizations made by a JIT/on-the-fly compiler, such as the optimization described above, cannot be done when caching assemblies beforehand.

As stated above, most native languages do not keep track of information about the internal structure of the source code. In contrast, because of the metadata included with the intermediate byte code produced in managed environments, code that takes advantage of currently existing objects, creates new objects, inherits from existing objects and so on, can be readily generated at runtime. Runtime-generated code may require a special mechanism to be used to create or load the dynamic code without loading the runtime-generated code from a long-term storage medium (e.g., hard disk). Such a mechanism shall be referred to as Reflection Emit in the rest of this document. Code that is generated at runtime, which is also called dynamically-generated code, is typically compiled during every process instance to intermediate byte code, and then processed by the JIT/on-the-fly compiler. This is an every-process cost that may not be trivial.

SUMMARY

If an entity such as a managed assembly or a portion of a managed assembly such as a method or function generates additional code at runtime, if that method or function is pure, the additional runtime-generated code is cached so that on subsequent executions of the entity, the cached runtime-generated code can be retrieved from the cache by looking up its identifier and retrieving the identified code from the cache, bypassing one or more phases of code generation. Furthermore, the cached code can be pre-compiled by a compiler and/or can be added as extra data to the metadata of the source assembly. Hence runtime-generated code can be cached and reused across instances of a program. At runtime one or more runtime-generated code caches are inspected and if the identified entity is present in the cache, it is loaded and used, eliminating the intermediate byte code generation phase, the compilation/translation phase or both the intermediate byte code generation phase and the compilation/translation phase.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
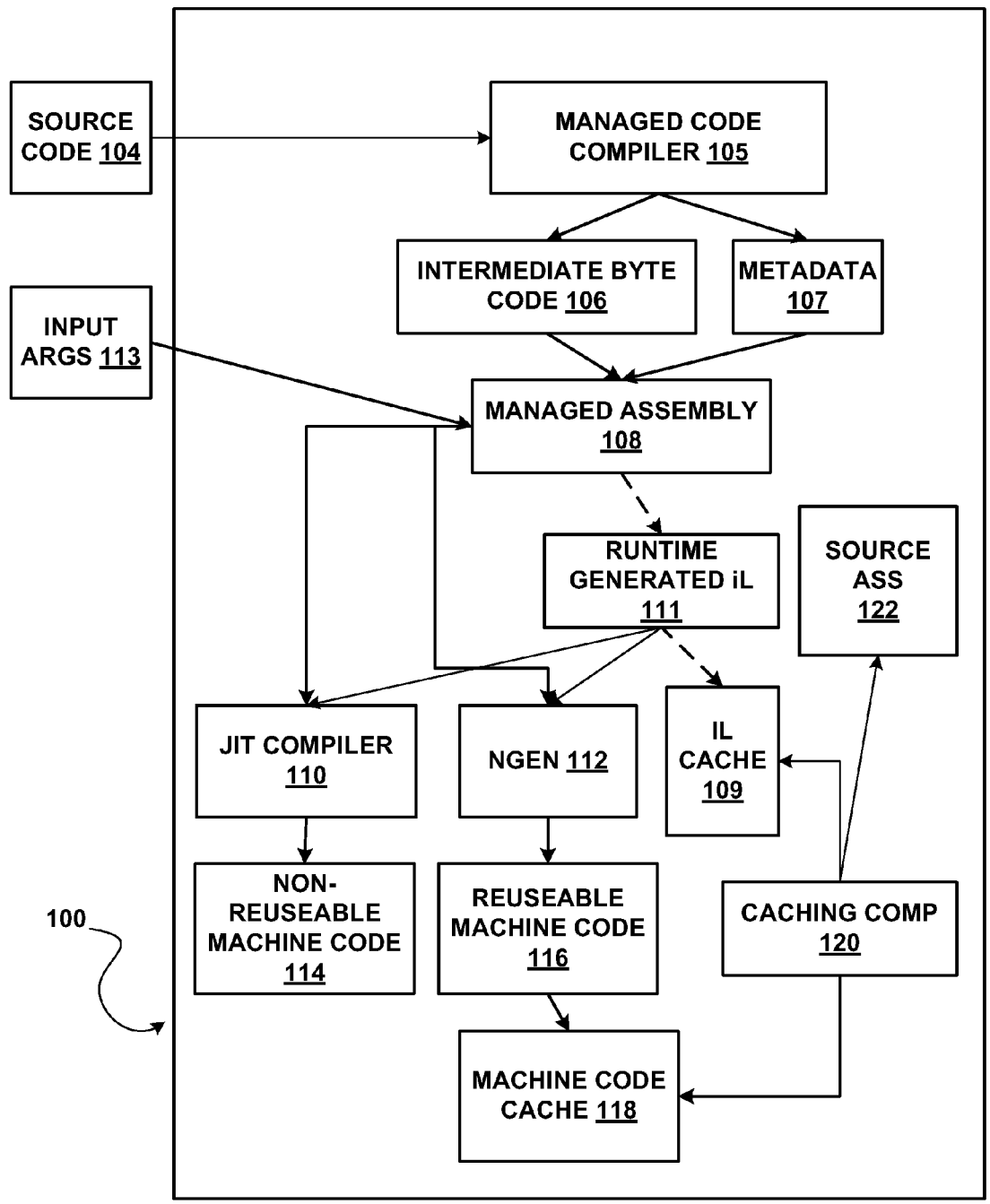
FIG. 1 is a block diagram of an example of a system for caching runtime generated code in accordance with aspects of the subject matter disclosed herein.

Reflection Emit is a mechanism that enables additional program instructions to be created dynamically at runtime and invoked. That is, the program architecture itself can be decided at runtime based upon the data, services, and specific operations that are applicable at runtime. For example, suppose a particular program performs mathematics operations and a user wants to perform computations based on a matrix of a specific size. One approach is to write a generic function capable of performing computations on a matrix of any size.

Such a function is static because the algorithm by which it operates directly solves the desired problem. Such a program is likely to have inefficiencies because of its requirement to operate on any size matrix. Alternatively, a dynamic solution to the problem may involve the generation of a custom algorithm to solve the problem. Such a solution would involve a static function A that given various input arguments would use some of those arguments to generate a new dynamic function B, and then pass other various input arguments to that dynamic function. This customized dynamic function would likely only work on particular inputs, but it might be written in a manner that allows best performance given such a restricted input set. For example, static function A may receive a request to multiply two matrices of size 16×16 together. Static function A may generate a new dynamic function B which is only capable of multiplying 16×16 matrices together. Then static function A may delegate to dynamic function B the actual task of multiplying the matrices together.

By using mechanisms such as Reflection Emit, additions may be made to program instructions programmatically (dynamically) at runtime. That is, to continue the example above, by using a mechanism such as Reflection Emit, optimizations may be made to the generic program instructions programmatically (dynamically) at runtime to optimize this particular execution of the program for the 16×16 matrix. The dynamic modifications made by mechanisms such as Reflection Emit may improve performance, increase compatibility or provide other useful advantages. Within the context of an object-oriented environment, Reflection Emit enables the creation of new types and new methods on types and can specify the algorithm that new methods implement. Within a managed code environment, intermediate byte code may be generated through Reflection Emit. In known existing systems, the runtime-generated intermediate byte code has to be compiled/converted to native machine instructions every time the program runs.

In accordance with aspects of the subject matter disclosed herein, the first time a dynamic program is run, the intermediate byte code is created, given an execution-context-specific identifier and cached. The next time the program runs, the intermediate code may not have to be re-created. For example, suppose a dynamic function (i.e., a function generating intermediate byte code at runtime) exists. Suppose further that the function accepts two arguments that may or may not vary between executions of the function. Depending on the values of the received arguments, different intermediate byte code will be created. In accordance with aspects of the subject matter disclosed herein, an identifier based on the argument values and dynamic-code-generating-function name may be created and associated with the intermediate byte code produced by this execution of the function. The identified byte code can be cached, either in an intermediate byte code cache or in the metadata portion of the assembly, so that the next time the function is executed with the same values for the arguments, the cached byte code can be retrieved from the cache and loaded directly into memory, eliminating the need to regenerate the intermediate byte code. Similarly, an identifier for the dynamic function may be based on the argument values given to the function that generates the dynamic function. The identifier for the cached dynamic function may be based on the algorithm the generating function uses to generate the dynamic function. An identifier for the dynamic function may identify a particular version of the dynamic-code-generating-function.

Furthermore, if the intermediate byte code is converted to native code, the native code can be cached either in a native code cache or in the metadata portion of the source assembly. The next time the program executes, neither generation of intermediate byte code nor conversion of the byte code to native binary code has to be performed. The native binary code can be loaded and executed directly from the native code cache. The cached native binary code may be identified as described in the previous paragraph.

Caching Runtime Generated Code

FIG. 1 illustrates an example of a system 100 that caches runtime generated code in accordance with aspects of the subject matter disclosed herein. System 100 may include one or more of the following: one or more components 120 that cache runtime generated code and/or perform a lookup operation on a runtime-generated code cache such as intermediate byte code cache 109 and/or reusable (machine code) executable cache 118 and/or source assembly cache 122 and return the identified code to a requester, a compiler 105, a JIT or on-the-fly compiler 110 and one or more caches such as intermediate byte code cache 109 and/or reusable (machine code) executable cache 118 and or source assembly cache 122. A JIT or on-the-fly compiler may generate in memory, executable but non-reusable native code. Input arguments such as input arguments 113 may be provided when a program is to be run.

System 100 may also include a native image generator such as NGEN 112. A native image generator may generate and store a reusable machine code executable 116 in native binary (machine language). Reusable machine code executable 116 may be stored in a reusable (machine code) executable cache 118. Intermediate byte code may be stored in an intermediate byte code cache 109. Native binary or intermediate byte code may be stored in a source assembly cache 122. Intermediate byte code cache 109, reusable (machine code) executable cache 118 and/or source assembly cache 122 may be machine-wide or system-wide caches. All or portions of system 100 may reside on one or more computers such as the computers described below with respect to FIG. 3. The system 100 or portions thereof may comprise a portion of an integrated design environment 600 (IDE) such as the ones described and illustrated below with respect to FIG. 4, residing on one or more computers such as the computers described with respect to FIG. 3 also described below. Alternatively, system 100 or portions thereof may be provided as a stand-alone system or as a plug-in.

A compiler 105 may comprise a .NET compiler that compiles source code written in a .NET language to intermediate byte code (e.g., common intermediate language or CIL). .NET languages include but are not limited to Visual Basic, Visual J#C++. C#J#Java Script, APL, COBOL, Pascal, Eiffel, Haskell, ML, Oberon, Perl, Python, Scheme, Smalltalk or any other .NET language. Compiler 102 may comprise a JAVA compiler that compiles source code written in JAVA to JAVA byte code.

Compiler 105 may compile source code 104 into one or more managed assemblies 108, etc. Source code 104 may include dynamic program code, that is, code that when executed generates additional code at runtime, e.g., runtime-generated intermediate byte code 111. A managed assembly may include intermediate byte code 106 and metadata 107. Metadata 107 may include information concerning custom attributes that identify if an entity such as an assembly, or a portion of an assembly such as a function or method of the assembly generates code at runtime, and if the entity is suitable for caching. In general, a program entity that is suitable for caching does not perturb global state. Such an entity is called "pure" or "purely functional". For example, a pure function does not perturb global state. Metadata may be embedded in the generating function, in the argument data that is passed to a generator of dynamic code or elsewhere. Source assemblies may be maintained in a source assembly cache (library) such as source assembly cache 122.

As is known in the art, when any assembly is executed, the assembly is loaded into memory. If a pre-compiled executable is available, (created by a native image generator such as NGEN 112, for example), the native binary may be loaded and executed. If a pre-compiled executable is not available, the JIT or on-the-fly compiler 110 may convert the managed assembly 108 to non-reusable native binaries 114 in memory. In known systems, even if the program itself has been pre-compiled in native binary format, code that is generated by the program at runtime has to be recompiled every time the program is run. A mechanism such as Reflection Emit is called that generates the additional program code (e.g., Reflection Emit generates intermediate byte code, such as runtime-generated intermediate byte code 111, using the additional information stored in the metadata of the assembly). The runtime-generated intermediate byte code 111 is generated and the JIT or on-the-fly compiler converts the runtime-generated intermediate byte code into non-reusable executable native binaries 114 (machine code).

In contrast, in accordance with aspects of the subject matter disclosed herein, runtime-generated code can under certain circumstances be cached (e.g., in intermediate byte code cache 109 and/or in reusable (machine code) executable cache 118 and/or in source assembly cache 122). For example, suppose a program includes a pure function that generates additional code at runtime. A pure function, as used herein, refers to a function that does not perturb global state. Suppose the function A takes two arguments, argument a and argument b. The intermediate code generated when function A is called with argument a=value 1 and argument b=value 2 is the same. Hence, by creating a particular identity for the runtime code generating method for the particular values of the argument or arguments (execution-specific characteristics) to that method and caching the intermediate code generated, generation of the intermediate language can be eliminated for subsequent calls to that function.

Hence, the first time the function is executed, the intermediate language can be generated, identified and cached. The second time the function is executed using value 1 for argument a and value 2 for argument b, the intermediate code does not need to be generated because it has been cached. The intermediate code identified by the function name and argument values can be retrieved from the cache instead, keyed on the identifier. Furthermore, if native code has been generated from the intermediate code (e.g., through a native binary image generator such as NGEN), the machine code can be retrieved from the machine code cache, eliminating the need to generate the intermediate byte code and the need to generate native machine code from the intermediate byte code.

Common scenarios may be tested and intermediate byte code that is commonly generated can be produced and/or native binaries may be produced and pre-cached. In accordance with some aspects of the subject matter disclosed herein, the intermediate byte code and/or native binary image may be included as additional metadata in the assembly so that even the first time the assembly is run on a user's machine and the machine—wide intermediate byte code cache and/or native binary machine code cache is empty, the intermediate byte code or native binary can be found in the assembly itself. In accordance with some aspects of the subject matter disclosed herein, an assembly that has been updated with the dynamic-code-generating function may receive a new version number and/or the previous (e.g., un-updated or original) cache information for that assembly may be discarded or be unused.

Figure 2A:
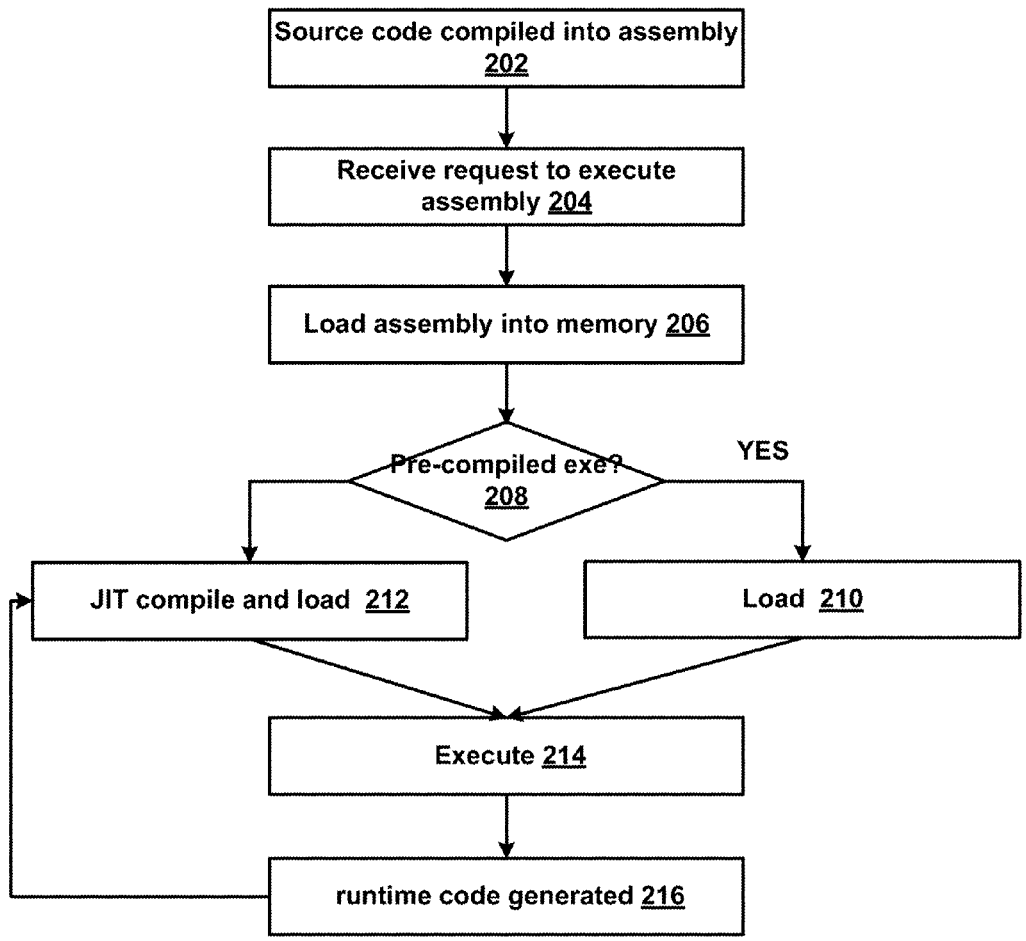
FIG. 2a is a method for executing a dynamic program as is known in the art.

FIG. 2a illustrates a method for runtime-generated code as is known in the art. At 202 source code comprising a dynamic program (a program that produces runtime-generated code) may be compiled by a compiler such as the ones described above with respect to FIG. 1. The output of the compiler may be an assembly comprising intermediate byte code and metadata associated with the intermediate byte code produced. At 204 a request to execute the assembly may be received. At 206 the assembly may be loaded into memory. At 208, a lookup based on the identifier key, may determine if a pre-compiled native binary executable is available. At 210 the lookup process may determine that a native binary executable is available and may load and execute the native binary executable. At 208 the lookup may determine that a pre-compiled native binary executable is not available.

In response to this determination, at 212 a JIT or on-the-fly compiler may compile or translate the intermediate byte code into native binary, load and execute the binary. At 214, whether pre-compiled or JIT compiled, the dynamic program may execute. At 216 the dynamic program may generate additional program code as it executes by calling a mechanism such as Reflection Emit. This runtime-generated code may be emitted by Reflection Emit as intermediate byte code. Before the runtime-generated code can be executed, it has to be compiled into native binary code by the JIT or on-the-fly compiler. There is no capability for a pre-compilation of the runtime-generate code and there is no way to create a native binary executable for the runtime-generated code.

Figure 2B:
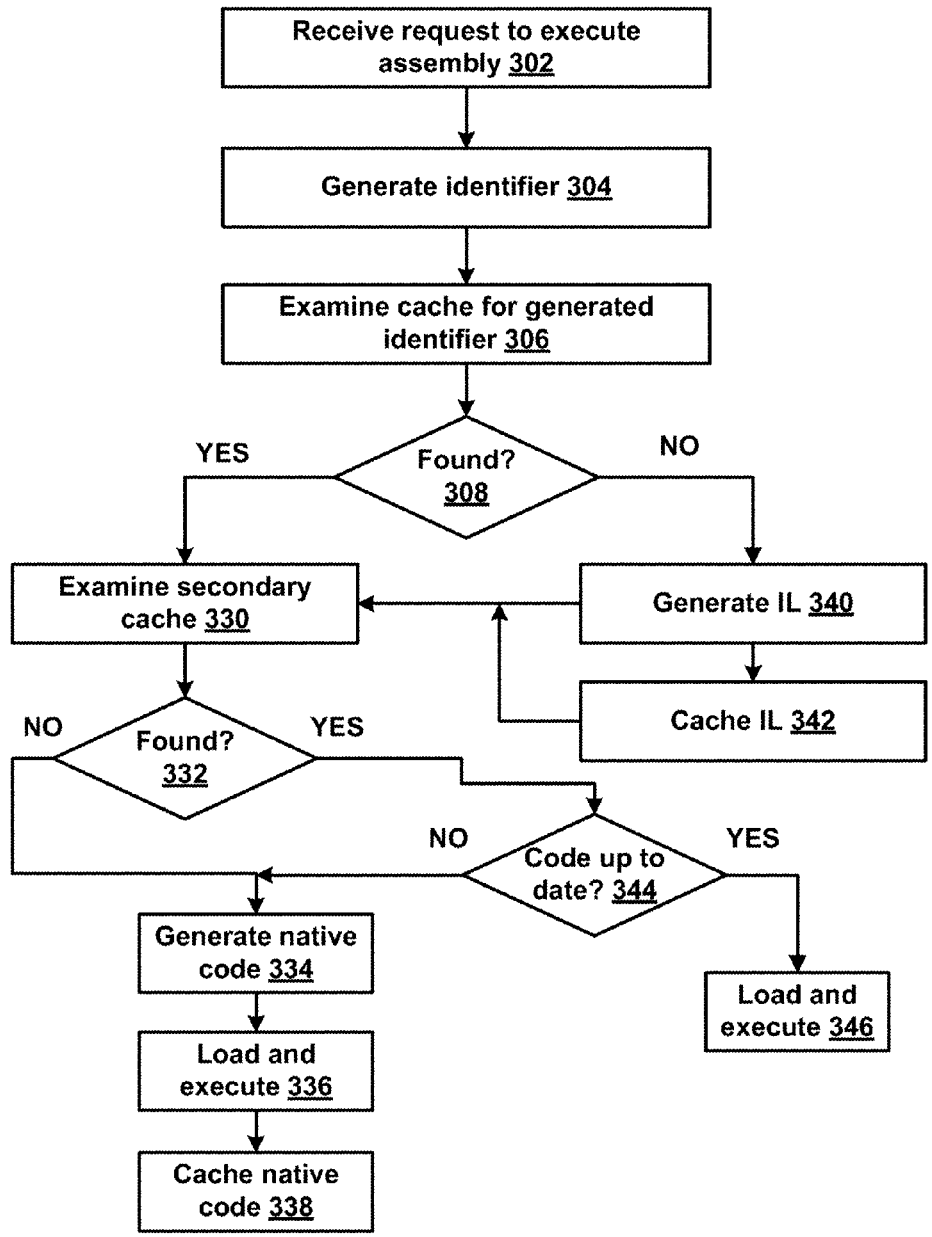
FIG. 2b is an example of a method for caching runtime generated code in accordance with aspects of the subject matter disclosed herein.

FIG. 2b illustrates an example of a method for caching runtime-generated code in accordance with aspects of the subject matter disclosed herein. At 302, a request to generate a program entity such as a dynamic program or a portion of a program such as a dynamic method or function may be received. A program entity suitable for caching may be determined by the presence of a particular indicator in the metadata associated with the method that is generating the program entity. A method or function that is suitable for having its results cached is one that does not perturb global state. A method or function that does not unexpectedly change global state is called a "pure" method (or a "pure" function). In accordance with aspects of the subject matter disclosed herein, the indicator for such a method or function may be a custom attribute. At 304, an identifier may be calculated or generated according to a specified algorithm or schema.

For example, suppose the function A takes two arguments, argument a and argument b. Intermediate code is generated when function A is called with argument a=value 1 and argument b=value 2 that differs from the intermediate code that is generated when function A is called with argument a≠value a and/or argument b≠value 2. The intermediate code that is generated the next time function A is called with argument a=value 1 and argument b=value 2 is the same as the first time function A is called with argument a=value 1 and argument b=value 2 unless function A changes between calls. To assure that outdated caches are not used, and are automatically flushed, a particular identity for the runtime-code-generating function A may be generated using the name of the function (e.g., "[Namespace::]ObjectName::A") and include in addition to the particular values of the arguments (value 1 and value 2), the strong name of the assembly containing function A That is, use of the particular values of the arguments in the identifier prevents use of the wrong intermediate code and use of the strong name of the assembly containing the function A is used to ensure that intermediate code for the wrong version of the assembly are not used (e.g., assembly 1 means to call old function A and assembly 2 means to call updated function A).

At 306, the first cache such as the intermediate byte code cache may be examined for the identified program entity. If, at 308, the calculated identifier is found in the first cache, (e.g., an intermediate byte code cache), a second cache may be inspected at 330. The secondary cache may be a native binary code cache. At 332 if the identified program entity is found in the secondary cache, the native code can be validated against the results of the intermediate byte code cache lookup to determine if it is the same version as that of the intermediate code cache and at 346, if the native code is up to date (e.g., the same version as the intermediate byte code at 344 for the identified program entity), the native code binary can be loaded and executed. If, at 332 the identified program entity is not found in the secondary (native code) cache, the native code can be generated (by a JIT or on-the-fly compiler or NGENed for later caching) at 334, loaded and executed at 336 and if NGENed, cached at 338.

If at 308, the intermediate code for the program entity is not found in the primary cache, at 340, the intermediate code can be generated at 340, (e.g., by invoking Reflection Emit) and cached at 342. After generation of the intermediate code at 340, the secondary cache can be inspected at 330 for the program entity. The secondary cache may be a native binary code cache. At 332 if the identified program entity is found in the secondary cache, the native code can be validated against the results of the intermediate byte code cache lookup to determine if it is the same version as that of the intermediate code cache at 344 and at 346, if the native code is up to date (e.g., the same version as the intermediate byte code for the identified program entity), the native code binary can be loaded and executed. If, at 332 the identified program entity is not found in the secondary (native code) cache, the native code can be generated (by a JIT or on-the-fly compiler or NGENed for later caching) at 334, loaded and executed at 336 and if NGENed, cached at 338. It will be appreciated that the native binary code cache may be within the assembly itself or can be a machine-wide cache. Similarly, it will be appreciated that a first cache may be an intermediate byte code cache or source assembly cache.

Figure 2C:
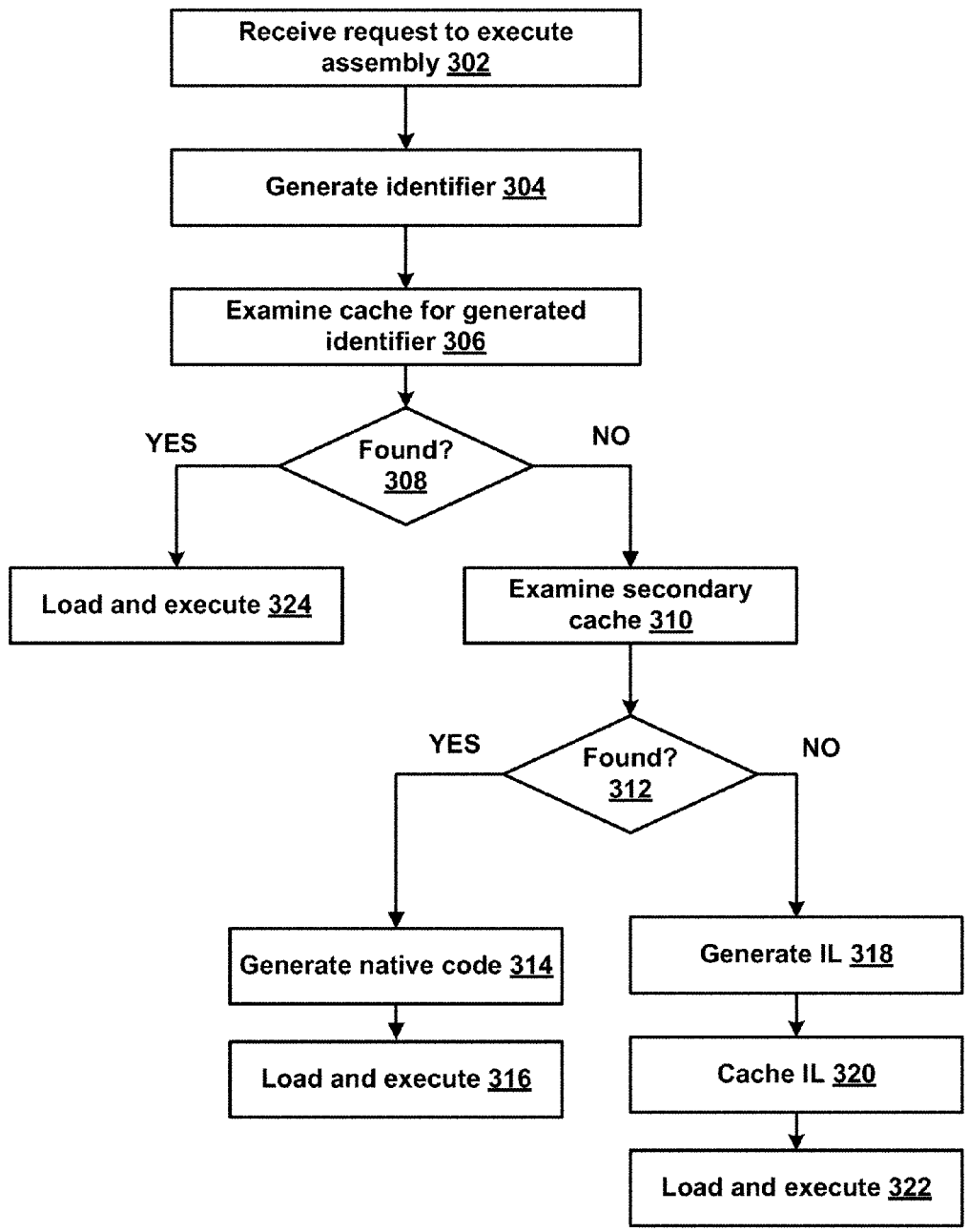
FIG. 2c is another example of a method for caching runtime generated code in accordance with aspects of the subject matter disclosed herein.

In accordance with other aspects of the subject matter disclosed herein, referring to FIG. 2c at 306, the first cache such as the native binary code cache may be examined for the identified program entity. If, at 308, the calculated identifier is found in the first cache, (e.g., a native binary code cache), at 324 the native binary code can be retrieved from the native binary code cache and loaded and executed. If the calculated identifier is not found in the first cache (e.g., a native binary code cache), a lookup can be performed in a second cache (e.g., an intermediate byte code cache) for the identified entity at 310. At 312, if the intermediate code for the identified entity is found in the intermediate byte code cache, the intermediate byte code can be retrieved and translated/compiled into native code at 314. Optionally the native code can be cached. At 316 the native code can be loaded and executed. If the intermediate byte code for the identified entity is not found in the intermediate byte code cache, the intermediate byte code can be generated (e.g., by invoking Reflection Emit), the intermediate byte code generated at 318, the intermediate byte code can be cached at 320 and loaded and executed at 322. It will be appreciated that the native binary code cache may be within the assembly itself or can be a machine-wide cache. Similarly, it will be appreciated that a first cache may be an intermediate byte code cache or source assembly cache and vice versa.

Example of a Suitable Computing Environment

Figure 3:
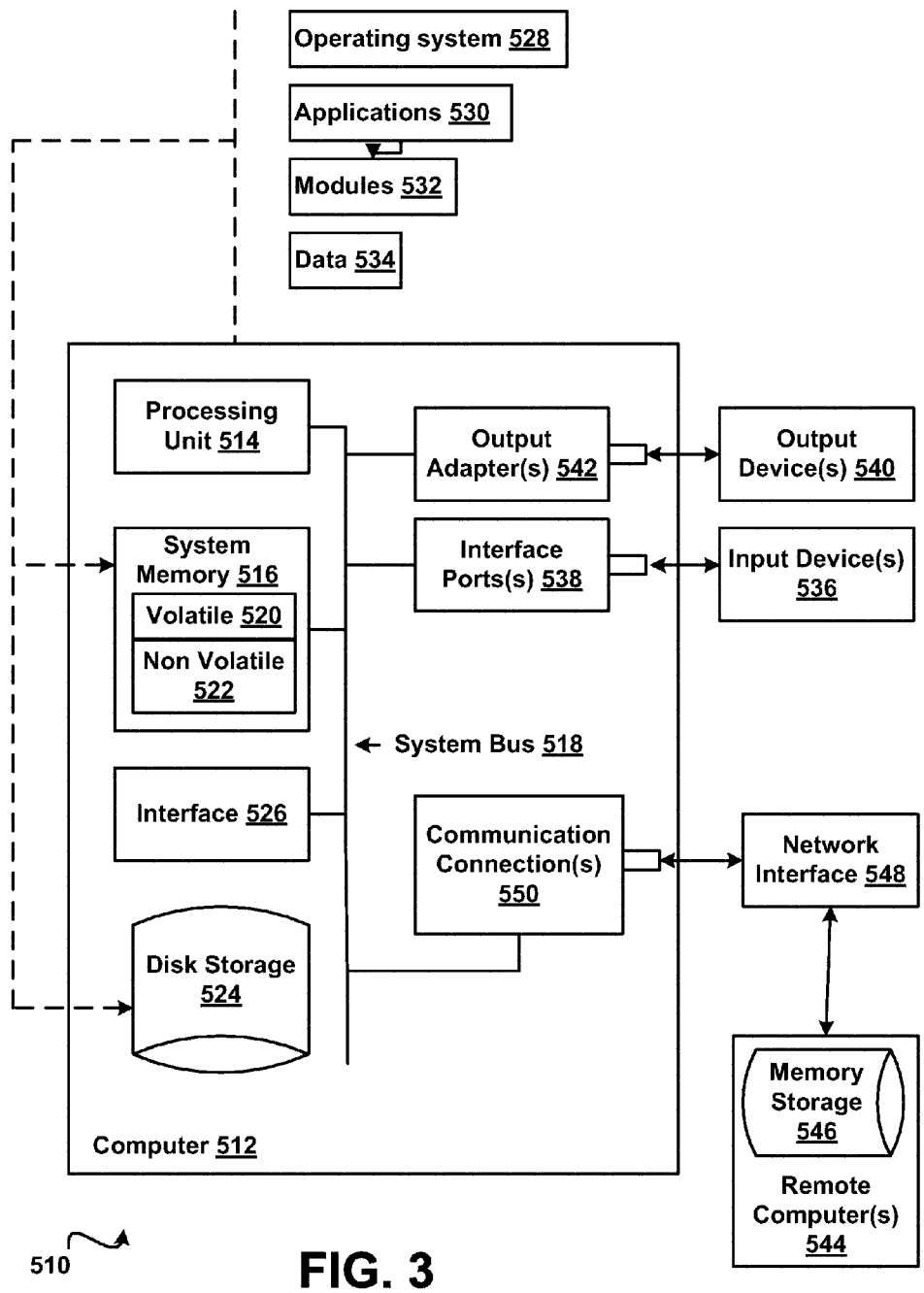
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a general purpose computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
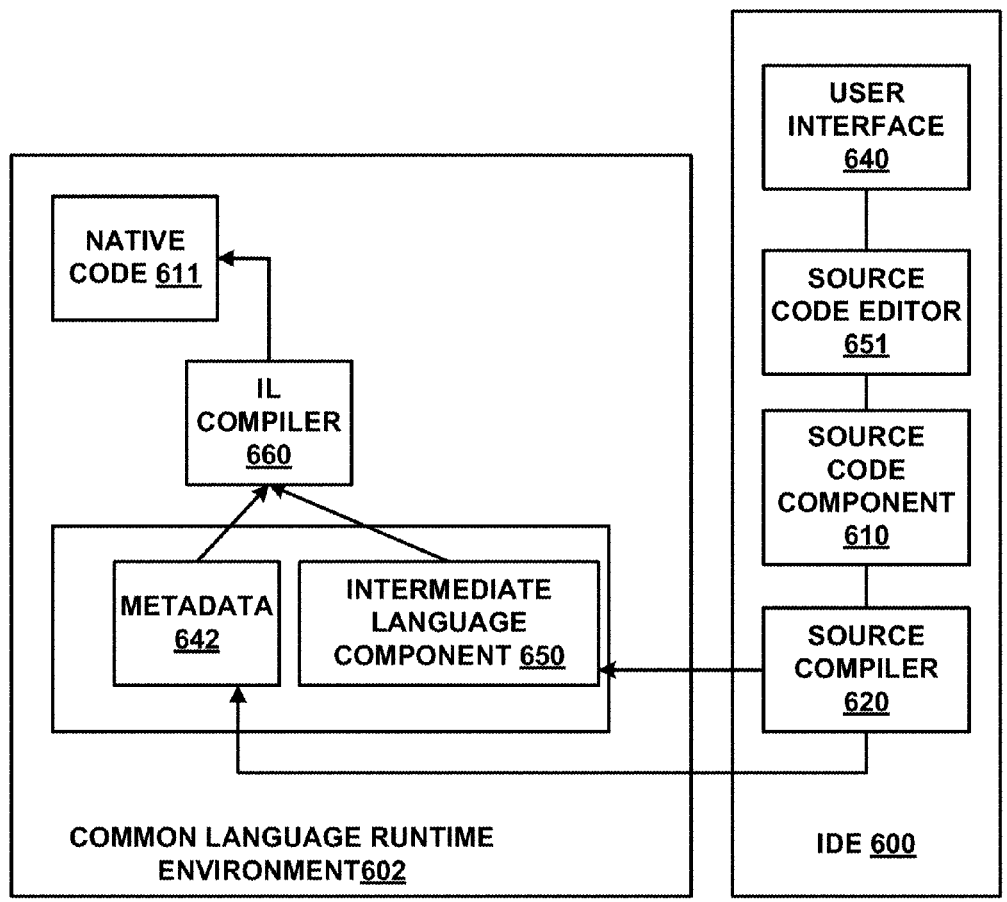
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#C++. C#J#Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system that caches runtime-generated code comprising:
   a processor; and
   a memory coupled to the processor that contains a program, which, when executed by the processor, is configured to cache a cacheable entity in a cache by performing the steps of:
      determining whether a dynamic-code-generating entity is a pure function;
      in response to determining that the dynamic-code-generating entity is a pure function, calculating an identifier for the cacheable entity, the cacheable entity comprising runtime-generated code generated based on the dynamic-code-generating entity, the runtime-generated code comprising intermediate byte code;

determining whether the calculated identifier is found in a first cache configured to store the runtime-generated code;
in response to determining that the calculated identifier is not found in the first cache, generating and storing the cacheable entity in the first cache; and
in response to determining that the calculated identifier is found in the first cache:
determining whether the calculated identifier is found in a second cache configured to store native binary code for the runtime-generated code that is generated from the intermediate byte code; and
generating, loading, and executing the native binary code and storing the generated native binary code in the second cache in response to determining that the calculated identifier is not found in the second cache.

2. The system of claim 1, the steps further comprising:
in response to determining that the calculated identifier is found in the first cache,
bypassing generation of intermediate byte code for the runtime-generated code for subsequent executions of the dynamic-code-generating entity.

3. The system of claim 1, the steps further comprising:
in response to determining that the calculated identifier is found in the second cache,
bypassing generation of native binary code for the runtime-generated code for subsequent executions of the dynamic-code-generating entity.

4. The system of claim 1, wherein the intermediate byte code for the runtime-generated code is generated by a Reflection Emit mechanism when the dynamic-code-generating entity executes.

5. The system of claim 1, wherein the calculated identifier is comprised of a name associated with the dynamic-code-generating entity, at least one argument passed to the dynamic-code-generating entity and a version indicator for the dynamic-code-generating entity.

6. The system of claim 1, wherein the first cache comprises a system-wide cache and the second cache comprises a system-wide cache.

7. A method of caching runtime-generated code comprising:
determining whether a runtime-code-generating entity is a pure function;
in response to determining the runtime-code-generating entity is a pure function:
calculating an identifier for an entity comprising runtime-generated code generated based on the runtime-code-generating entity, the runtime-generated code entity comprising intermediate byte code created by a Reflection Emit mechanism, the calculated identifier comprising execution-context-specific characteristics of the runtime-generated code, the execution-context-specific characteristics identifying a version of the runtime-code-generating entity;
determining whether the calculated identifier is found in a first cache configured to store the runtime-generated code entity;
in response to determining that the calculated identifier is not found in the first cache, generating and storing the runtime-generated code entity in the first cache keyed on the calculated identifier upon a first execution of the runtime-generated code entity;
in response to determining that the calculated identifier is found in the first cache:
determining whether the calculated identifier is found in a second cache configured to store native binary code for the runtime-generated code entity that is generated from the intermediate byte code; and
loading and executing the native binary code from second cache in response to determining that the calculated identifier is found in the second cache; and
returning the stored runtime-generated code entity in response to a second execution of the stored runtime-generated code entity, wherein generation of the intermediate byte code for the stored runtime-generated code entity is bypassed for the second execution of the stored runtime-generated code entity.

8. The method of claim 7, further comprising:
in response to determining that the calculated identifier is not found in the second cache, generating the native binary code for the runtime-generated code from the intermediate byte code for the stored runtime-generated code entity.

9. The method of claim 7, wherein the first cache is a source assembly comprising the stored runtime-generated code entity.

10. The method of claim 7, wherein the calculated identifier comprises an identifier comprised of a name associated with the runtime-code-generating entity, at least one argument passed to the runtime-code-generating entity and a version indicator for the runtime-code-generating entity.

11. A computer-readable storage medium, the computer-readable storage medium being hardware and comprising computer-executable instructions which when executed cause a managed computing environment to:
determine whether a runtime-code-generating entity is a pure function; and
in response to determining the runtime-code-generating entity is a pure function:
calculate an identifier for a cacheable entity, the cacheable entity comprising runtime-generated code generated based on the runtime-code-generating entity, the runtime-generated code comprising intermediate byte code;
determine whether the calculated identifier is found in a first cache configured to store the runtime-generated code;
in response to determining that the calculated identifier is not found in the first cache, generate and store the cacheable entity in the first cache; and
in response to determining that the calculated identifier is found in the first cache:
determine whether the calculated identifier is found in a second cache configured to store native binary code for the runtime-generated code that is generated from the intermediate byte code; and
generate, load, and execute the native binary code and store the generated native binary code in the second cache in response to determining that the calculated identifier is not found in the second cache.

12. The computer-readable storage medium of claim 11, comprising further computer-executable instructions, which when executed cause the computing environment to:
in response to determining that the calculated identifier is found in the first cache,
bypass generation of the intermediate byte code for the runtime-generated code for subsequent executions of the runtime-code-generating entity.

13. The computer-readable storage medium of claim 11, comprising further computer-executable instructions, which when executed cause the computing environment to:
   in response to determining that the calculated identifier is found in the second cache,
   bypass generation of the native binary code from the intermediate byte code for the runtime-generated code for the subsequent executions of the runtime-code-generating entity.

14. The computer-readable storage medium of claim 11, comprising further computer-executable instructions, which when executed cause the computing environment to:
   cache the native binary code in a source assembly of the runtime-code-generating entity.

15. The computer-readable storage medium of claim 11, comprising further computer-executable instructions, which when executed cause the computing environment to:
   cache the intermediate byte code in a source assembly of the runtime-code-generating entity.

16. The computer-readable storage medium of claim 11, wherein the calculated identifier comprises execution-specific characteristics of the cacheable entity stored in the first cache.

17. The computer-readable storage medium of claim 16, comprising further computer-executable instructions, which when executed cause the computing environment to:
   retrieve the cacheable entity from the first cache keyed on the calculated identifier.

18. The computer-readable storage medium of claim 11, wherein the intermediate byte code is generated by a Reflection Emit mechanism.

19. The computer-readable storage medium of claim 16, wherein the execution-specific characteristics identify a version of the runtime-code-generating entity.

20. The system of claim 1, wherein the component caching the cacheable entity further includes:
   in response to determining that the calculated identifier is not found in the second cache, generating the native binary code for the runtime-generated code from the intermediate byte code for the runtime-generated code entity.

* * * * *